T. G. WALKER.
PROCESS OF EVAPORATING BRINE AND OTHER LIQUIDS.
No. 10,537. Reissued Oct. 28, 1884.
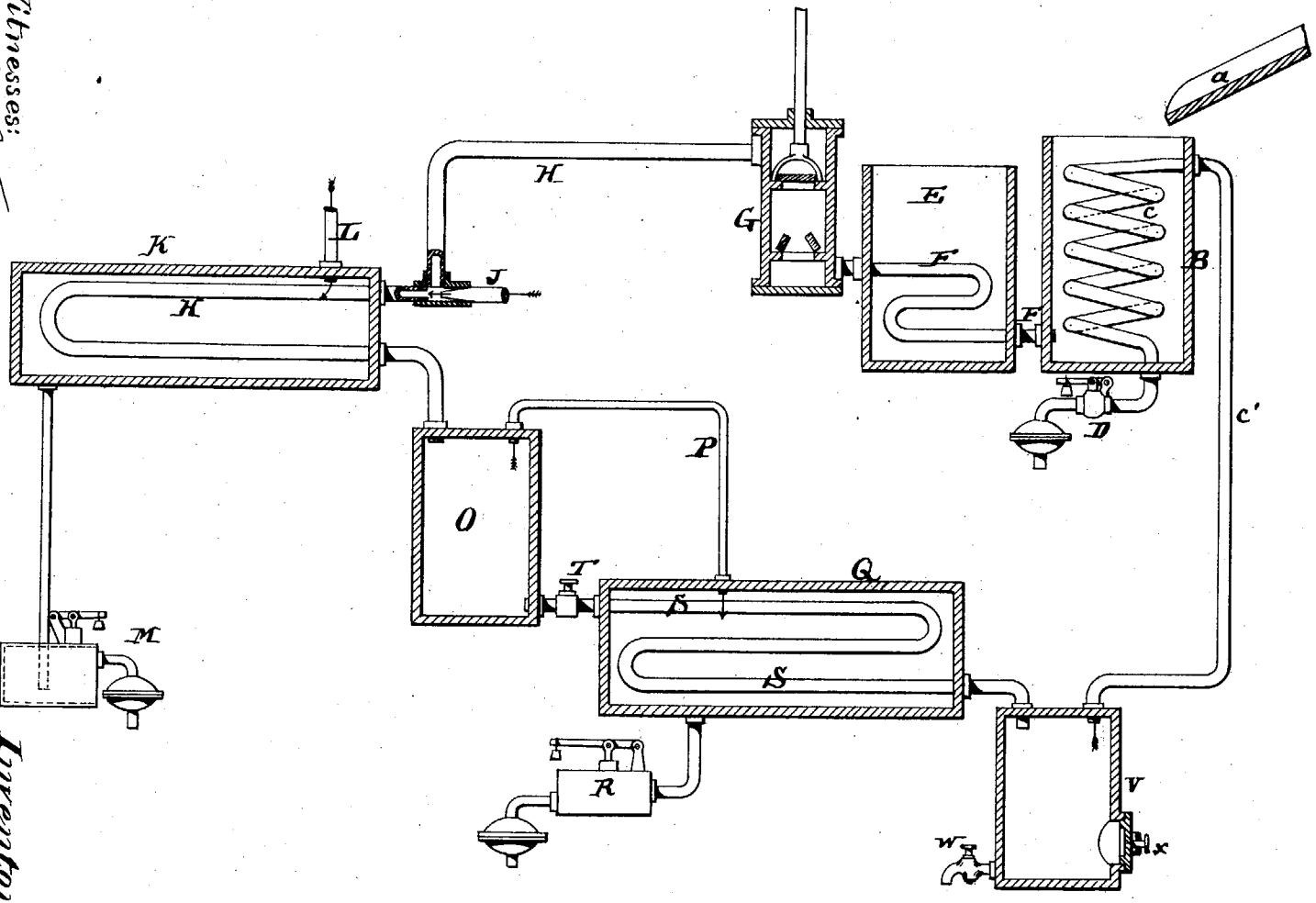
Witnesses:
John C. Trumbridge
Harry M. Turk
Inventor:
Thos. Geo. Walker
by his attorneys
Briesen & Steele
N. PETERS, Photo-Lithographer, Washington, D. C.

UNITED STATES PATENT OFFICE.

THOMAS GEORGE WALKER, OF MORRISTOWN, NEW JERSEY.

PROCESS OF EVAPORATING BRINE AND OTHER LIQUIDS.

SPECIFICATION forming part of Reissued Letters Patent No. 10,537, dated October 28, 1884.

Original No. 264,208, dated September 12, 1882. Application for reissue filed September 17, 1884.

DIVISION B.

*To all whom it may concern:*

Be it known that I, THOMAS GEORGE WALKER, of Morristown, in the State of New Jersey, have invented an Improvement in Process of Evaporating Brine and other Liquids, of which the following is a specification.

This improvement is for removing the watery portion from brine and other liquids or semi-liquid materials, and for preventing any unnecessary loss of heat.

In the drawing I have shown the apparatus for carrying my improvement into effect by a vertical sectional view of the various appliances made use of.

I provide a tank, B, into which the material to be concentrated is supplied by a spout, *a*, or other suitable means. Within this tank B there is a coil of pipe, *c*, that receives the steam from the previously-heated material, as hereinafter indicated.

At D there is a valve with a weighted lever, by means of which a limited amount of pressure is maintained in the coil *c*, so as to insure the proper transfer of the latent heat from the steam as it condenses to the contents of the tank B.

The pipe F passes away from the lower part of the tank B to the pump G, that is actuated by suitable power, and drives the liquid to be concentrated through the other portions of the apparatus. If the vapors formed by the heat are likely to interfere with the action of the pump, a vessel, E, may be employed, through which the pipe F passes, and which may contain a liquid to sufficiently cool the material to prevent the development of steam.

Into the vessel K steam is supplied by the pipe L from a boiler, and the water of condensation is removed by the pipe and steam trap M. A pressure is maintained in said vessel K that is greater than the pressure upon the liquid passing through the pipe H. I prefer to use about sixty pounds pressure in K, and thirty pounds pressure in H.

Through the vessel K there is a pipe, H, the same being a continuation of the eduction-pipe from the pump, so that the liquid to be concentrated is forced under pressure through this pipe H to the receiver O, and in its passage it is exposed to the heat from the steam in the vessel K, and I remark that the number of coils of said pipe H within the vessel K may be greater or less than that represented in the drawing. The steam supplied into the pipe H by the jet-nozzle J serves to atomize the material, increase its heat, and promote the rapidity with which such material passes through the pipe H, and at the same time the temperature is raised so high that when the material passes into the vessel O sufficient heat has been absorbed to cause a portion of the water to flash into steam. The constant influx of material under pressure from the pump G through the pipe H into the vessel O and the cock T and valve R maintains in that vessel a pressure (say of thirty pounds) which is enough to cause the partially-concentrated materials in O to pass by the cock T forward from the bottom portion of such vessel O through the pipe S into the receiving-vessel *v*, and the steam from the upper part of the vessel O passes by the pipe P into the vessel Q around the pipe S, so as to give up to the material within said pipe S sufficient heat to vaporize an additional proportion of the watery matters. This is due to the condensation of the steam into water in Q while under a pressure, say, of thirty pounds, and the giving out its latent heat, which is absorbed by the hot liquid materials passing through such pipe S under a lower pressure, say, of five pounds. This causes the materials in the pipe S to absorb sufficient heat to convert almost all the water into vapor. The valve and trap at R allow the escape-water of condensation to pass away, but maintain a pressure in the vessel Q of about thirty pounds. When the material is delivered into the vessel *v*, it parts with its steam very rapidly, and it is then removed through the man-hole *x*, or by the pipe and plug or cock W, or other equivalent device. The steam that is developed in the vessel *v* is taken by the pipe *c'* to the coil *c* in the vessel B to heat the fresh material. By this process the heat of the vapor generated under one pressure is availed of in evaporating the other liquid portions at a lower pressure. This operation, can be carried forward many more times than heretofore described. In case the object sought is the distillation of the liquid portion, and not the concentration of such liquid, then the liquid escaping from the cocks R and D is to be saved for use.

I do not claim condensing liquids by forcing them under pressure in form of a spray through heated pipes, as I know this to be old.

I claim—

The method herein described of removing the watery portions from substances, which consists in forcing the said substances by pressure through a pipe which extends through a steam-vessel, at the same time injecting a jet of steam into said pipe to atomize the material and increase its heat, and surrounding the said pipe by steam under pressure greater than is the pressure upon the substance passing through said pipe, substantially as specified.

THOS. GEO. WALKER.

Witnesses:

WILLY G. E. SCHULTZ,

GUSTAV SCHNEPPÉ.